UNITED STATES PATENT OFFICE 2,298,818

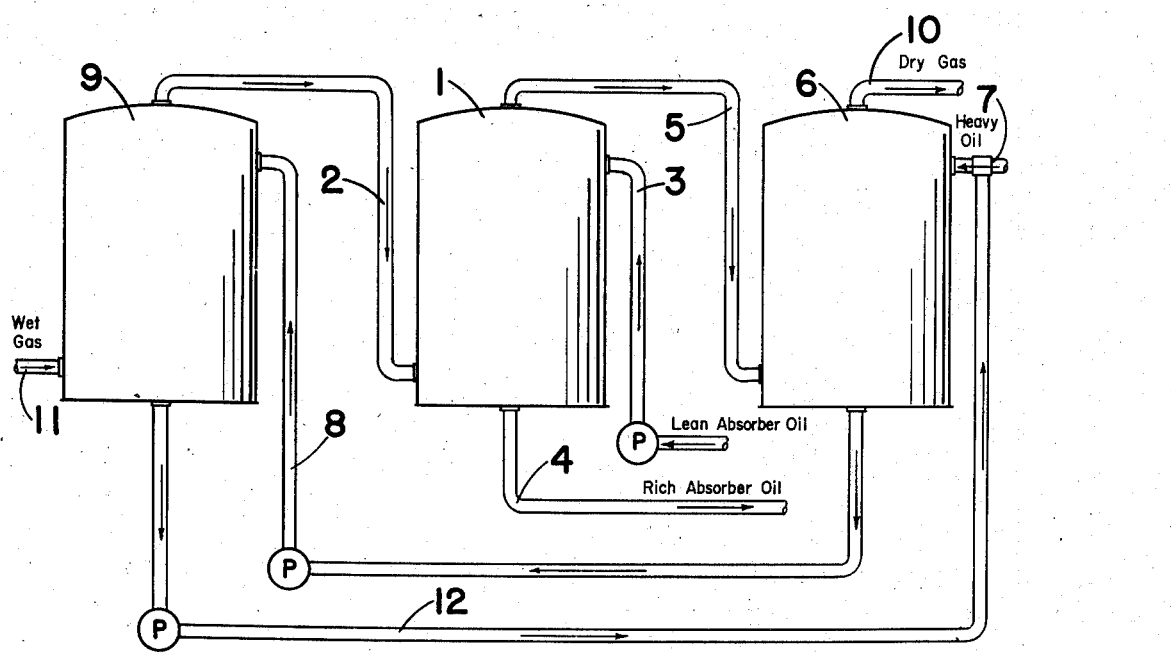

METHOD FOR RECOVERING LIQUIDS FROM GASES

Stuart E. Buckley, Houston, Tex., assignor to Standard Oil Development Company, a corporation of Delaware Application July 22, 1939, Serial No. 285,922

1 Claim. (Cl. 183—114.6)

The present invention is directed to a method for recovering gasoline and/or distillate from gas at high pressure.

In the recovery of natural gasoline and distillate from high pressure gases from distillate wells, it is conventional to pass the gas through an absorber where it flows countercurrently to an absorption medium. Preferably this absorption medium is one having the greatest possible solubility for the distillate contained in the gas and will, therefore, preferably be of low molecular weight and of a chemical nature compatible with that of the distillate itself. Under the prevailing conditions, usually at a pressure ranging upwardly from 500#/sq. in., and generally in the neighborhood of 2000#/sq. in., there is a strong tendency for the absorption oil to be dissolved in or entrained in the gaseous stage and carried off.

According to the present invention this difficulty is surmounted by passing the gas, after it has been stripped by a suitable absorber oil, countercurrent to a heavier oil which has little or no solubility in the dry gas under the conditions of operation. This heavier oil absorbs the lighter absorber oil from the dry gas. The lighter oil is, preferably, then recovered from the heavier oil in a separate operation. However, the heavier oil may then be passed countercurrently to the wet gas in a tower preceding the main absorption tower in which the recovered absorber oil is taken up by the wet gas before it passes into the main absorption tower.

The present invention will be better understood from the following detailed description of the accompanying drawing in which the single figure is a front elevation, in diagrammatic form, of a plant suitable for the practice of the method of the present invention.

Referring to the drawing in detail, numeral 1 designates the main absorption tower to the bottom of which rich gas is introduced through pipe 2. Lean absorber oil enters the top of tower 1 through pipe 3 which, in the conventional manner, is a draw-off pipe from a stripping tower. The absorber oil in this case, as previously indicated, is a hydrocarbon oil of low molecular weight and containing hydrocarbons as nearly similar in chemical structure as possible to those which it is desired to recover from the wet gas. Preferably this absorber oil should not be of higher boiling range than kerosene. The enriched absorber oil leaves tower 1 through draw-off line 4 through which it is fed into a stripping tower, not shown.

The stripped gas which now contains some absorber oil, leaves tower 1 through overhead pipe 5 and is discharged into the bottom of a second absorber tower 6 into the top of which is fed, through line 7, a heavier oil such as a tar of suitable viscosity, a heavy gas oil, a bright stock, or the like. This oil, in passing countercurrently to the gas, through suitable contacting means, such as baffle plates or the like, picks up from the gas the light absorber oil entrained or dissolved therein and leaves the bottom of tower 6 through line 8 through which it is discharged into the top of tower 9. Dry gas leaves the tower 6 through line 10.

Wet gas from the well is introduced through line 11 into the bottom of tower 9 and passes upwardly therethrough countercurrent to the heavy absorber oil containing light absorber oil. The wet gas strips out the light absorber oil from the heavy menstruum and leaves tower 9 through overhead line 2 by which it is introduced into the bottom of tower 1. The stripped heavy menstruum leaves the bottom of tower 9 through line 12 by which it is conducted back to feed line 7. Suitable pumps are arranged in the system to maintain the circulation.

The nature and objects of the present invention having been thus described and illustrated, what is claimed as new and useful and is desired to be secured by Letters Patent is:

A method for recovering hydrocarbons boiling within the gasoline range from a gas obtained from distillate wells under a pressure in the neighborhood of 2000 pounds per square inch containing them together with normally gaseous hydrocarbons which comprises passing the high pressure gas through an absorption zone countercurrently to a heavy hydrocarbon absorption menstruum boiling above the kerosene range and containing low boiling hydrocarbons capable of extracting gasoline constituents from the gas, passing the gas leaving said absorption zone into a second absorption zone countercurrently to a hydrocarbon absorption menstruum boiling below the gas oil range, passing the gas leaving the second absorption zone and the menstruum leaving the first absorption zone countercurrently to each other in a third absorption zone and feeding the menstruum from the third absorption zone to the first absorption zone.

STUART E. BUCKLEY.